United States Patent
Woo et al.

(10) Patent No.: US 12,139,604 B2
(45) Date of Patent: Nov. 12, 2024

(54) POLYALKYLENE CARBONATE-BASED RESIN, AND MOLDED ARTICLE PRODUCED THEREFROM

(71) Applicant: LG CHEM, LTD., Seoul (KR)

(72) Inventors: Won Hee Woo, Daejeon (KR); Seung Young Park, Daejeon (KR); Sung Kyoung Kim, Daejeon (KR); Sang Cheol Shin, Daejeon (KR); Kyung Min Min, Daejeon (KR); Won Seok Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 164 days.

(21) Appl. No.: 17/606,863

(22) PCT Filed: Jan. 22, 2021

(86) PCT No.: PCT/KR2021/000904
§ 371 (c)(1),
(2) Date: Oct. 27, 2021

(87) PCT Pub. No.: WO2021/153950
PCT Pub. Date: Aug. 5, 2021

(65) Prior Publication Data
US 2022/0220300 A1 Jul. 14, 2022

(30) Foreign Application Priority Data
Jan. 29, 2020 (KR) .......... 10-2020-0010536

(51) Int. Cl.
| | | |
|---|---|---|
| C08L 67/04 | (2006.01) | |
| C08J 3/22 | (2006.01) | |
| C08J 5/18 | (2006.01) | |
| C08L 33/12 | (2006.01) | |
| C08L 59/04 | (2006.01) | |
| C08L 69/00 | (2006.01) | |

(52) U.S. Cl.
CPC .............. *C08L 67/04* (2013.01); *C08J 3/226* (2013.01); *C08J 5/18* (2013.01); *C08L 33/12* (2013.01); *C08L 69/00* (2013.01); *C08J 2359/02* (2013.01); *C08J 2367/00* (2013.01); *C08J 2367/04* (2013.01); *C08J 2369/00* (2013.01); *C08J 2423/08* (2013.01); *C08J 2433/12* (2013.01); *C08J 2467/00* (2013.01); *C08J 2467/04* (2013.01); *C08L 59/04* (2013.01); *C08L 2201/06* (2013.01); *C08L 2205/03* (2013.01)

(58) Field of Classification Search
CPC .......... C08L 69/00; C08L 67/04; C08L 33/12; C08L 23/0853; C08L 59/02; C08L 59/04; C08J 2359/02
See application file for complete search history.

(56) References Cited

U.S. PATENT DOCUMENTS

| | | | |
|---|---|---|---|
| 9,663,654 B2 | 5/2017 | Cho et al. | |
| 2003/0013821 A1* | 1/2003 | Tan .......................... | B32B 27/10 |
| | | | 525/413 |
| 2011/0309539 A1 | 12/2011 | Steinke et al. | |
| 2013/0102715 A1 | 4/2013 | Kim et al. | |
| 2015/0025163 A1 | 1/2015 | Park et al. | |
| 2016/0145431 A1 | 5/2016 | Cho et al. | |
| 2016/0177088 A1* | 6/2016 | Cho ........................ | C08L 1/02 |
| | | | 524/35 |
| 2018/0127578 A1 | 5/2018 | Marin Perales et al. | |
| 2018/0305542 A1 | 10/2018 | Lee et al. | |
| 2019/0300702 A1 | 10/2019 | Park et al. | |

FOREIGN PATENT DOCUMENTS

| | | |
|---|---|---|
| CN | 103254596 A | 8/2013 |
| CN | 104387737 A | 3/2015 |
| CN | 108350164 A | 7/2018 |
| EP | 3000847 A1 | 3/2016 |
| JP | 2014530947 A | 11/2014 |
| KR | 20020053820 A | 7/2002 |
| KR | 10-2011-0127727 A | 11/2011 |

(Continued)

OTHER PUBLICATIONS

Yongjin Li and Hiroshi Shimizu, Compatibilization by Homopolymer: Significant Improvements in the Modulus and Tensile Strength of PPC/PMMA Blends by the Addition of a Small Amount of PVAc, Appl. Mater. and Interfaces 2009, vol. 1, No. 8, 1650-1655 (Year: 2009).*

Menglu Xia et al., "Effects of chain extender and uniaxial stretching on the properties of PLA/PPC/mica composites," Polymers for Advanced Technologies, 2019, vol. 30, No. 9, pp. 2436-2446.

Carlos Diaz et al., "Film Performance of Poly(lactic acid) Blends for Packaging Applications," Journal of Applied Packaging Research, 2016, vol. 8, No. 3, pp. 43-51.

Dandan Wu et al., "Mechanical properties, miscibility, thermal stability, and rheology of poly(propylene carbonate) and poly(ethylene-co-vinyl acetate) blends", Polymer Bulletin, 2015, vol. 72, pp. 851-865.

(Continued)

*Primary Examiner* — Heidi R Kelley
*Assistant Examiner* — Surbhi M Du
(74) *Attorney, Agent, or Firm* — Bryan Cave Leighton Paisner LLP

(57) ABSTRACT

The present disclosure provides a polyalkylene carbonate-based resin having excellent thermal stability, thereby having an improved heat shrinkage phenomenon, and a molded article produced using the same. The polyalkylene carbonate-based resin includes 100 parts by weight of a base resin including a polyalkylene carbonate resin and a polylactide resin, and 5 parts by weight to 10 parts by weight of a heat shrinkage prevention agent, wherein the base resin includes the polyalkylene carbonate resin and the polylactide resin in a weight ratio of 6:4 to 4:6, and the heat shrinkage prevention agent is one or more selected from the group consisting of a polyalkyl(meth)acrylate-based resin, a polyalphaolefin-vinyl acetate-based resin, and a polyoxyalkylene-based resin.

10 Claims, No Drawings

(56) References Cited

FOREIGN PATENT DOCUMENTS

| | | |
|---|---|---|
| KR | 10-2014-0118881 A | 10/2014 |
| KR | 10-1508612 B1 | 4/2015 |
| KR | 10-1703979 B1 | 2/2017 |
| KR | 10-2017-0106220 A | 9/2017 |
| KR | 10-2018-0050252 A | 5/2018 |
| KR | 10-2018-0075312 A | 7/2018 |
| KR | 10-2018-0076350 A | 7/2018 |
| KR | 20180075312 A * | 7/2018 |
| WO | 2006123608 A1 | 11/2006 |

OTHER PUBLICATIONS

Barbara A. Calderon et al., "Evidence of compatibility and thermal stability improvement of poly(propylene carbonate) and polyoxymethylene blends", Journal of Applied Polymer Science, 2017, 45823.

Search Report of European Patent Office in Appl'n No. 21747139.0, dated Mar. 21, 2022.

* cited by examiner

POLYALKYLENE CARBONATE-BASED RESIN, AND MOLDED ARTICLE PRODUCED THEREFROM

CROSS-REFERENCE TO RELATED APPLICATIONS

This application is a National Phase entry pursuant to 35 U.S.C. § 371 of International Application No. PCT/KR2021/000904, filed on Jan. 22, 2021, and claims the benefit of and priority to Korean Patent Application No. 10-2020-0010536, filed on Jan. 29, 2020, in the Korean Intellectual Property Office, the entire contents of which are incorporated by reference in their entirety for all purposes as if fully set forth herein.

TECHNICAL FIELD

Technical Field

The present invention relates to a polyalkylene carbonate-based resin for producing a blown film, and particularly, to a polyalkylene carbonate-based resin having excellent thermal stability, thereby having an improved heat shrinkage phenomenon, and a molded article produced using the same.

BACKGROUND ART

Plastic is used as a material for various articles due to its ease of manufacture and ease of use. Plastic is used in a variety of fields, such as for construction materials and automotive interior materials, as well as for disposable products such as packaging films, disposable cups, and disposable plates.

Among the above, there is a cast film produced by T-die extrusion and a blown film produced by blown extrusion as the packing films. A cast film is produced by stretching one layer of a film through T-die cast, and a blown film is produced by hollow molding a film, stretching the same in a whole body direction, and then secondarily stretching the stretched film through a roll. Since a cast film is produced as a film having a single layer and the film is stretched only in a machine direction MD during extrusion, molecules in the film are oriented in only the machine direction MD. Thus, there is a significant difference between the physical properties of the film in the machine direction MD and the physical properties of the same in a width direction TD, and there is a problem in that the film is easily torn during stretching. Therefore, as a film to be applied to a molded article requiring two or more layers of a film, a blown film is preferable, which is a biaxially stretched film in which two or more layers of a film are primarily stretched through hollow molding, and then secondarily stretched on a roll, so that molecules in the film are oriented in both the machine direction MD and the width direction TD.

Specifically, the blown film is produced by forming a bubble in a tube shape through a circular die, followed by blowing air therein, and then winding the bubble in the form of a tube. At this time, it is important to adjust a heat shrinkage rate of the film. Since the blown film is a biaxially stretched film, heat shrinkage of the film occurs both in the machine direction MD and the width direction TD. A heat shrinkage rate is generally proportional to the degree of stretching when producing a blown film. Therefore, it is a major task to adjust the heat shrinkage rate when producing the blown film.

Meanwhile, the blown film is generally produced using a polyethylene-based resin and a polypropylene-based resin. However, since the amount of plastics used has increased in recent years, the amount of plastic wastes has been increased. However, most plastics are not decomposed in the natural environment, and thus, plastic wastes are mainly treated through incineration. Therefore, toxic gases and the like are discharged during the incineration, causing environmental pollution. Therefore, in recent years, a biodegradable plastic which is decomposed naturally in the natural environment has been developed.

The biodegradable plastic is a plastic which gradually decomposes in moisture due to its chemical structure, and starts to decompose within a few weeks in a wet environment such as soil or seawater, and then disappears within one year to several years. In addition, a decomposition product of the biodegradable plastic decomposes into components harmless to a human body, such as water or carbon dioxide, so that there is a little damage to the environment.

An example of the biodegradable plastic is a polyalkylene carbonate resin. The polyalkylene carbonate resin is not only biodegradable but also has excellent transparency, elasticity, elongation, gas barrier properties, and the like, and thus, is being applied for various purposes. However, the polyalkylene carbonate resin has a problem of being poor in some chemical and/or mechanical properties such as heat resistance and tensile strength.

In order to compensate for the problem improve the biodegradability and processability of the polyalkylene carbonate resin, a method of mixing and using a polyalkylene carbonate resin and a polylactide resin in a blend resin form has been proposed. However, when using a blend resin of a polyalkylene carbonate resin and a polylactide resin, unlike producing a sheet not requiring stretching and having a thickness of greater than 0.25 mm, or producing a cast film produced by T-die extrusion among films having a thickness of 0.25 mm or less, biaxially stretching is essentially accompanied when producing a blown film. The blend resin is poor in thermal stability, and thus, is easily deformed by heat, so that processing the same is difficult. Therefore, in order to improve flexibility, a plasticizer and the like are mixed and used. However, a plasticizer has a problem of flowing out onto the surface of a molded article over time, thereby degrading quality such as transparency. In addition, since a blown film is produced in a form in which two or more layers of a film are stacked, there is a need to secure openness for separating each layer of the film.

PRIOR ART DOCUMENT

Patent Document (Patent Document 1) KR10-2017-0106220A

DISCLOSURE OF THE INVENTION

Technical Problem

The present invention has been devised to overcome the limitations mentioned in the background art of the present invention and is to provide a polyalkylene carbonate-based resin to be applied as a biodegradable plastic, which is an eco-friendly material, when producing a blown film.

The present invention is to apply the polyalkylene carbonate-based resin, thereby ensuring biodegradability, and at the same time, improving all of processability, openness, and heat shrinkage phenomenon which are required for a blown film.

That is, the present invention is to provide a polyalkylene carbonate-based resin having excellent thermal stability, thereby having an improved heat shrinkage phenomenon when producing a blown film, and having excellent biodegradability, processability, and openness.

Another aspect of the present invention provides a polyalkylene carbonate-based molded article produced using the polyalkylene carbonate-based resin.

Technical Solution

According to an aspect of the present invention, there is provided a polyalkylene carbonate-based resin including 100 parts by weight of a base resin including a polyalkylene carbonate resin and a polylactide resin, and 5 parts by weight to 10 parts by weight of a heat shrinkage prevention agent, wherein the base resin includes the polyalkylene carbonate resin and the polylactide resin in a weight ratio of 6:4 to 4:6, and the heat shrinkage prevention agent is one or more selected from the group consisting of a polyalkyl(meth)acrylate-based resin, a polyalphaolefin-vinyl acetate-based resin, and a polyoxyalkylene-based resin.

According to another aspect of the present invention, there is provided a polyalkylene carbonate-based resin produced from the resin described above.

Advantageous Effects

A polyalkylene carbonate-based resin according to the present invention includes a polyalkylene carbonate resin and a polylactide resin in a specific composition as a base resin, thereby having excellent tensile strength, elasticity, elongation, and gas barrier properties as well as excellent biodegradability and openness, and includes a heat shrinkage prevention agent in a specific content, thereby having excellent thermal stability to have an effect of an improved heat shrinkage phenomenon.

In addition, a polyalkylene carbonate-based molded article according to the present invention has an improved heat shrinkage phenomenon, thereby having an effect of excellent transparency.

MODE FOR CARRYING OUT THE INVENTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology and measurement methods used in the present invention can be defined as follows unless defined otherwise.

Measurement Method

In the present invention, 'weight average molecular weight (g/mol)' was measured under the following conditions with GPC(Gel permeation Chromatography)(PL GPC220, Agilent Technologies).

Column: Two PLgel Olexis(Polymer Laboratories Co., Ltd) columns and one PLgel mixed-C(Polymer Laboratories Co., Ltd) column were used in combination.

Sample concentration: 1 to 2 mg/ml(Diluted in chloroform)

Solvent: Chloroform was used.

Flow rate: 1.0 ml/min

Column temperature: 40° C.

Detector: Differential refractive index detector (RI)

Standard material: PS(polystyrene)

The present invention provides a polyalkylene carbonate-based resin having excellent thermal stability, thereby having an improved heat shrinkage phenomenon during molding.

The polyalkylene carbonate-based resin according to an embodiment of the present invention includes 100 parts by weight of a base resin including a polyalkylene carbonate resin and a polylactide resin, and 5 parts by weight to 10 parts by weight of a heat shrinkage prevention agent, wherein the base resin includes the polyalkylene carbonate resin and the polylactide resin in a weight ratio of 6:4 to 4:6, and the heat shrinkage prevention agent is one or more selected from the group consisting of a polyalkyl(meth)acrylate-based resin, a polyalphaolefin-vinyl acetate-based resin, and a polyoxyalkylene-based resin.

Plastic is used as a material for various articles due to its ease of manufacture and ease of use. Plastic is used in a variety of fields, such as for construction materials and automotive interior materials, as well as for disposable products such as packaging films, disposable cups, and disposable plates. However, most plastics are not decomposed in the natural environment, and thus, plastic wastes are mainly treated through incineration. Therefore, toxic gases and the like are discharged during the incineration, causing environmental pollution. Therefore, in recent years, a biodegradable plastic, such as a polyalkylene carbonate-based resin, which decomposes naturally in the natural environment has been developed.

A polyalkylene carbonate resin is not only biodegradable but also has excellent transparency, elasticity, elongation, and gas barrier properties, and the like, and thus, is being applied for various purposes. However, the polyalkylene carbonate resin has a problem of being poor in some chemical and/or mechanical properties such as heat resistance and tensile strength, and thus, is mixed with a polylactide resin and used in order to compensate for the problem and improve the biodegradability and processability thereof. However, a polyalkylene carbonate-based resin is poor in thermal stability, and thus, is easily deformed by heat. Therefore, when producing a molded article such as a blown film, heat shrinkage of the resin occurs, making is difficult to process the same.

However, the polyalkylene carbonate-based resin according to the present invention includes, as a base resin, a polyalkylene carbonate resin and a polylactide resin in a weight ratio adjusted to a specific range and includes a heat shrinkage prevention agent in a specific content, thereby having excellent physical properties which a base resin originally has, such as elasticity, elongation, and gas barrier properties, and having excellent thermal stability, so that a heat shrinkage phenomenon can be significantly improved.

Hereinafter, the polyalkylene carbonate-based resin will be described in detail for each component constituting the same.

Base Resin

In the present invention, the base resin can be a mixed resin including a polyalkylene carbonate resin and a polylactide resin. The mixed resin is a mixed resin to be applied to a blown film, and can have biodegradability as well as improved processability and openness which are required for a blown film.

The polyalkylene carbonate resin is a polymer having a repeating unit of —COO—$(CH_2)_n$—$CH_2CH_2O$—(n is an integer of 2 to 12), and specifically, can be one or more selected from the group consisting of polyethylene carbonate, polypropylene carbonate, polypentene carbonate, polyhexene carbonate, polyoctene carbonate, and polycyclohexene carbonate, and more specifically, can be polyethylene carbonate and polypropylene carbonate.

In addition, the weight average molecular weight of the polyalkylene carbonate resin can be 10,000 g/mol to 1,000,000 g/mol, specifically 50,000 g/mol to 500,000 g/mol, or 100,000 g/mol to 200,000 g/mol. In this case, the polyalkylene carbonate-based resin including the same can have excellent mechanical physical properties.

Meanwhile, in the present invention, the polyalkylene carbonate resin can be a copolymer or terpolymer prepared by copolymerization using an epoxide-based compound and carbon dioxide as monomers in the presence of an organometallic catalyst in an organic solvent.

At this time, the epoxide-based compound can be, for example, one or more selected from the group consisting of ethylene oxide, propylene oxide, 1-butene oxide, 2-butene oxide, isobutylene oxide, 1-pentene oxide, 2-pentene oxide, 1-hexene oxide, 1-octene oxide, cyclopentene oxide, cyclohexene oxide, styrene oxide, and butadiene mono-oxide. The carbon dioxide can be adjusted, for example, to 5 to 30 atmospheres (atm), and the copolymerization can be performed at 20 to 120° C.

In addition, the organic solvent can be, for example, one or more among an aliphatic hydrocarbon such as pentane, octane, decane, and cyclohexane, an aromatic hydrocarbon such as benzene, toluene, and xylene, a halogenated hydrocarbon such as chloromethane, methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene.

In addition, the polylactide resin is a polymer prepared using a lactic acid as a monomer, and can be one or more selected from the group consisting of poly(L-lactide), poly(D-lactide), and poly(L,D-lactic acid). Here, the poly(L-lactide) is prepared using an L-lactic acid as a monomer, the poly(D-lactide) is prepared using a D-lactic acid as a monomer, and the poly(L,D-lactide) is prepared using L- and D-lactic acids together.

In addition, the weight average molecular weight of the polylactide resin can be 50,000 g/mol to 400,000 g/mol, specifically 100,000 g/mol to 250,000 g/mol, in which case, the mechanical physical properties thereof can be more excellent.

Meanwhile, the base resin can include the polyalkylene carbonate resin and the polylactide resin in a weight ratio of 6:4 to 4:6, and as a specific example, can include the polyalkylene carbonate resin and the polylactide resin in a weight ratio of 5.5:4.5 to 4.5:5.5, or 5.2:4.8 to 4.8:5.2. In this case, the polyalkylene carbonate-based resin including the base resin can have excellent mechanical physical properties and thermal stability. Particularly, when the base resin includes the polylactide resin in a weight ratio of greater than 6:less than 4 with respect to the polyalkylene carbonate resin, biodegradability and processability are not sufficiently improved, and there is a problem in that openness, which is specifically required for a blown film, not for a general sheet or a cast film manufactured by T-die extrusion, is poor. In addition, when the base resin includes the polylactide resin in a weight ratio of less than 4:greater than 6 with respect to the polyalkylene carbonate resin, the elasticity of the base resin is degraded due to the polylactide resin having brittleness, so that a film is easily broken during molding. Therefore, it can be impossible to produce a blown film which essentially requires stretching of the film during molding.

Heat Shrinkage Prevention Agent

In the present invention, the heat shrinkage prevention agent serves to suppress heat shrinkage during molding using a polyalkylene carbonate-based resin. As described above, the heat shrinkage prevention agent can be one or more selected from the group consisting of a polyalkyl(meth)acrylate-based resin, a polyalphaolefin-vinyl acetate-based resin, and a polyoxyalkylene-based resin.

Specifically, the polyalkyl(meth)acrylate-based resin can be polymethyl methacrylate, and the polyalphaolefin-vinyl acetate-based resin can be polyethylene-vinyl acetate-based resin. The polyoxyalkylene-based resin can be a polyoxymethylene resin.

More specifically, the heat shrinkage prevention agent can be a polyalkyl(meth)acrylate-based resin, in which case a heat shrinkage suppression can be more effective.

Meanwhile, the heat shrinkage prevention agent can be included in an amount of 5 parts by weight to 10 parts by weight in a polyalkylene carbonate-based resin composition based on 100 parts by weight of a base resin. In this case, the base resin and the heat shrinkage prevention agent can be easily mixed, and at the same time, a heat shrinkage phenomenon during the molding of the resin composition can be more effectively suppressed.

In addition, the present invention provides a polyalkylene carbonate-based molded article produced using the polyalkylene carbonate-based resin.

The molded article according to an embodiment of the present invention is one produced by molding using the polyalkylene carbonate-based resin, and specifically, can be a blown film produced by blown molding.

According to an embodiment of the present invention, the heat shrinkage rate (%) of the molded article, which has been obtained by leaving a sample of an area of 5 cm×15 cm for 3 hours in an oven of 65° C. to measure the length thereof in the machine direction (MD; x) and the width direction (TD; y) and an area (A) thereof, and calculating the heat shrinkage rate through Equation 1 below, can be 7.00% or less, 6.00% or less, 0.01% to 6.00%, 1.00% to 6.00%, 3.00% to 6.00%, 4.00% to 6.00%, 4.40% to 5.90%, or 4.48% to 5.59%.

$$\text{Heat shrinkage rate (\%)} = [(\text{Initial area (B)} - \text{Area (A)}) / \text{Initial area (B)}] \times 100 \quad \text{[Equation 1]}$$

In Equation 1 above, the initial area (B) is the area of the sample before heat was applied thereto, which is 75 cm².

According to an embodiment of the present invention, the molded article is produced using the polyalkylene carbonate-based resin, and thus, can include a heat shrinkage prevention agent in a specific content. Therefore, heat shrinkage occurring during a molding process is significantly suppressed, so that the molded article can have excellent surface properties such as transparency.

According to an embodiment of the present invention, the molded article can be produced through a blown molding method.

For example, the molded article can be produced through a method including a step (Step 1) of pelletizing the polyalkylene carbonate-based resin to prepare a polyalkylene carbonate-based resin pellet, and a step (Step 2) of blown-molding the pellet.

At this time, the preparation of the polyalkylene carbonate-based resin can be preparing a polyalkylene carbonate-based resin composition by mixing a base resin including a polyalkylene carbonate resin and a polylactide resin with a heat shrinkage prevention agent, and the polyalkylene carbonate resin, the polylactide resin, and the heat shrinkage prevention agent are the same as described above.

Meanwhile, the mixing can be a typical dry blending or solution mixing. The solution mixing can be performed by solution-mixing a polyalkylene carbonate resin and a polylactide resin to prepare a base resin solution first, and then adding and mixing a solution including a heat shrinkage prevention agent with the base resin solution.

Specifically, the base resin solution can be prepared by solution-mixing a polyalkylene carbonate resin and a polylactide resin in the presence of a solvent. At this time, the polyalkylene carbonate resin and the polylactide resin can be mixed in a weight ratio of 6:4 to 4:6.

The solvent can be a solvent typically known to be used when mixing a polyalkylene carbonate resin and a polylactide resin. For example, ethylene chloride, 1,2-dichloroethane, N-methyl pyrrolidone, dimethyl sulfoxide, 1,4-dioxane, 1,3-dioxolane, 1,2-dioxolane, and the like can be used.

In addition, the solution including a heat shrinkage prevention agent can be prepared by dissolving the heat shrinkage prevention agent in the above solvent. At this time, the heat shrinkage prevention agent in the solution can be included in an amount of 5 parts by weight to 10 parts by weight based on 100 parts by weight of the base resin in the polyalkylene carbonate-based resin composition.

In addition, the solution mixing is not particularly limited, and can be performed using typical solution mixing means, for example, a mixer capable of stirring, a tank-type reactor, and the like. The solution mixing is not particularly limited as long as sufficient mixing is performed to achieve uniform solution mixing, and can be performed in a temperature range of 25° C. to 50° C. at a stirring rate of 50 rpm to 200 rpm for 0.5 hours to 2 hours.

In addition, when the mixing is solution mixing, solvent removal and drying can be further performed after the mixing. At this time, the solvent removal and the drying can be performed by commonly known methods. For example, as a solvent is removed, the viscosity of a resin composition rapidly increases, and accordingly, volatilization efficiency can be rapidly degraded. Therefore, the solvent removal can be performed using different types of solvent removal and recovery means for each section of viscosity, such as a section with a low viscosity and a section with a high viscosity. For example, the solvent removal can be performed by using one or more devices selected from the group consisting of a simple flash drum, a falling film evaporator, a thin film evaporator, an extrusion devolatilizer, a kneader devolatilizer, and a filmtruder.

In addition, when the mixing is dry mixing, the dry mixing can be performed by a typical method. For example, the dry mixing can be performed by adding a heat shrinkage prevention agent to a base resin, and using a Henschel mixer, a ribbon blender, or a typical blender. At this time, the base resin includes a polyalkylene carbonate resin and a polylactide resin in a weight ratio of 6:4 to 4:6, and the heat shrinkage prevention agent can be added in an amount of 5 parts by weight to 10 parts by weight based on 100 parts by weight of the base resin.

Step 1 is a step of pelletization for preparing a polyalkylene carbonate-based resin pellet by pre-molding a polyalkylene carbonate-based resin, and for example, can be performed by extrusion. The extrusion can be performed by a typical method, and for example, can be performed using one of blending processing devices such as a twin-screw extruder, a single-screw extruder, a roll-mill, a kneader, or a banbury mixer.

Step 2 is a step for producing a blown film by processing molding a polyalkylene carbonate-based resin pellet, and can be performed by blown molding.

The blown molding can be performed through a typical blown molding method, and can be performed by biaxial stretching in the machine direction MD and the width direction TD in terms of more effectively suppressing heat shrinkage occurring during the molding.

Hereinafter, Examples of the present invention will be described in detail so that those skilled in the art can easily carry out the present invention. However, the present invention can be embodied in many different forms, and is not limited to Examples set forth herein.

Preparation Example 1

In a glove box, an organozinc catalyst and methylene chloride were added to a high-pressure reactor, and then an ethylene oxide was added thereto. Thereafter, carbon dioxide was added thereto, and then a polymerization reaction was performed at 70° C. for 3 hours to prepare polyethylene carbonate having a weight average molecular weight of 140,000 g/mol. After the reaction ended, unreacted carbon dioxide and unreacted ethylene oxide were removed together with the methylene chloride solvent, and the prepared polyethylene carbonate was used to prepare a pellet (diameter: 3 mm, thickness: 3 mm) with an extruder. The prepared polyethylene carbonate (Mw 140,000 g/mol) pellet and a polylactide resin (PLA 2003D, NatureWorks Co., Ltd) were shaken at room temperature (23±5° C.) to be evenly mixed in a weight ratio of 5:5, and then the mixture was left to stand overnight in a vacuum oven of 40° C. Thereafter, a base resin in a pellet shape was prepared using an extruder.

Reference Example 1

Reference Example 1 was performed in the same manner as in Preparation Example 1 except that in Preparation Example 1, the polyethylene carbonate (Mw 140,000 g/mol) pellet and the polylactide resin (PLA 2003D, NatureWorks Co., Ltd) were mixed in a weight ratio of 7:3, not in the weight ratio of 5:5, to prepare a base resin.

Reference Example 2

Reference Example 2 was performed in the same manner as in Preparation Example 1 except that in Preparation Example 1, the polyethylene carbonate (Mw 140,000 g/mol) pellet and the polylactide resin (PLA 2003D, NatureWorks Co., Ltd) were mixed in a weight ratio of 3:7, not in the weight ratio of 5:5, to prepare a base resin.

Experimental Example 1

Using the base resin prepared in each of Reference Examples 1 and 2, tensile strength and elongation were measured in the following manner, and are shown in Table 1 below.

(1) Tensile Strength (kgf/cm$^2$) and Elongation (%)

A T-die film was prepared from each base resin pellet of Reference Examples, and tensile strength and elongation were measured using the prepared film.

Using UTM-5965 (Universal Testing Machine, Instron Co., Ltd), 5 specimens in a dumbbell shape were prepared in accordance with ASTM D638 specifications, and then tensile strength was measured for each of the 5 specimens at a rate of 500 mm/min. The average tensile strength thereof is shown as a result.

In addition, elongation was measured under the same conditions as the tensile strength, while the elongation was measured until each of the 5 specimens were cut. The average elongation thereof is shown as a result. Meanwhile, elongation is a measure representing the flexibility of a resin. When elongation is 150% or higher, flexibility is sufficiently excellent.

TABLE 1

| Classification | Tensile strength (kgf/cm$^2$) | Elongation (%) |
| --- | --- | --- |
| Reference Example 1 | 158 | 261 |
| Reference Example 2 | 188 | 7 |

As shown in Table 1 above, in the case of Reference Example 2, elongation was greatly degraded, so that flexibility was confirmed to be extremely poor. In the case of a blown film produced from the base resin of Reference Example 2, the stability of the film was degraded due to the brittleness of the polylactide resin, so that it was confirmed that there was a problem in that the blown film was torn in a grain direction.

At this time, the blown film was produced by inflation molding to a thickness of 30 μm at an extrusion temperature of 150° C. using a twin screw extruder (single layer blown film extrusion line, Yoojin Engineering Co., Ltd). At this time, a die gap was 2.0 mm, and a blown-up ratio was 2.3.

Meanwhile, a biodegradability test was conducted on the base resin prepared in each of Preparation Example 1 and Reference Example 1 by the OWS Co., Ltd in Belgium. The base resin of Preparation Example 1 exhibited biodegradability of about 20%, but the base resin of Reference Example 1 exhibited biodegradability of about 8%. Therefore, the biodegradability of the base resin of Reference Example 1 was confirmed to be lower than that of the base resin of Preparation Example 1.

In addition, when producing the base resin of Reference Example 1 in a pellet shape, the die swell of a strand discharged from the extruder die was severe, and melt strength and openness were confirmed to be poor.

From the above results, it was confirmed that the base resin of Reference Example 1 and the base resin of Reference Example 2 were not suitable as a base resin of a polyalkylene carbonate-based resin to be applied to a blown film.

Example 1

Polymethyl methacrylate (IF850, LG Chem) was added to the base resin prepared in Preparation Example 1, and was shaken at room temperature (23±5° C.) to be uniformly mixed. At this time, the polymethyl methacrylate was used in an amount of 5 parts by weight based on 100 parts by weight of the base resin. Thereafter, a polyethylene carbonate-based resin in a pellet shape was prepared using an extruder.

Example 2

A polyethylene carbonate-based resin in a pellet shape was prepared in the same manner as in Example 1 except that in Example 1, polymethyl methacrylate was used in an amount of 10 parts by weight based on 100 parts by weight of the base resin.

Example 3

A polyethylene carbonate-based resin in a pellet shape was prepared in the same manner as in Example 2 except that in Example 2, polyethylene-vinyl acetate(ES18002, LG Chem) was used instead of polymethyl methacrylate.

Example 4

A polyethylene carbonate-based resin in a pellet shape was prepared in the same manner as in Example 2 except that in Example 2, polyoxymethylene(KEPITAL F40-03, KEP) was used instead of polymethyl methacrylate.

Comparative Example 1

The base resin in a pellet shape prepared in Preparation Example 1 was used.

Comparative Example 2

A polyethylene carbonate-based resin in a pellet shape was prepared in the same manner as in Example 1 except that in Example 1, polymethyl methacrylate was used in an amount of 3 parts by weight based on 100 parts by weight of the base resin.

Comparative Example 3

A polyethylene carbonate-based resin in a pellet shape was prepared in the same manner as in Example 1 except that in Example 1, polymethyl methacrylate was used in an amount of 15 parts by weight based on 100 parts by weight of the base resin.

Meanwhile, in Examples and Comparative Examples, the polyethylene carbonate-based resins were all prepared by dry blending without using a solvent, so that the ratios of the materials used were maintained even in the prepared polyethylene carbonate-based resins.

Experimental Example 2

The polyethylene carbonate-based resin pellet of each of Examples 1 to 4 and Comparative Examples 1 to 3 was blown and molded to produce a blown film. Thereafter, the heat shrinkage rate of the blown film was analyzed to confirm thermal stability. The results are shown in Table 2 below.

At this time, the blown film was produced by inflation molding to a thickness of 30 μm at an extrusion temperature of 150° C. using a twin screw extruder(single layer blown film extrusion line, Yoojin Engineering Co., Ltd). At this time, a die gap was 2.0 mm, and a blown-up ratio was 2.3.

Meanwhile, the polyethylene carbonate-based resin of Comparative Example 3 was torn during the molding, and thus, failed to produce a blown film. It is speculated that when polymethyl methacrylate is used in an amount of greater than 10 parts by weight based on 100 parts by weight of a base resin, the mixability between the base resin and the polymethyl methacrylate is greatly degraded, and thus, the uniform mixing of the two is not achieved, so that tearing occurs in a film production process.

(1) Thermal Stability Analysis

Thermal stability was confirmed through changes in the size and area of a film before and after heat was applied to the film.

A sample was produced to dimensions of 5 cm×15 cm from each film, and each sample was left to stand for 3 hours in an oven of 65° C. to measure the length of each sample in the machine direction (MD; x) and the width direction (TD; y) and the area (A) thereof, and then the heat shrinkage rate (%) thereof was calculated through Equation 1 below. At this time, the smaller the heat shrinkage rate, the more excellent the thermal stability.

Heat shrinkage rate (%)=[(Initial area (B)−Area (A)/Initial area (B)]×100    [Equation 1]

In Equation 1 above, the initial area (B) is the area of the sample before heat was applied thereto, which is 75 cm².

(2) Tensile Strength (kgf/cm²) and Elongation (%)

A T-die film was prepared from each resin pellet of Examples and Comparative Examples, and tensile strength and elongation were measured using the prepared film.

Using UTM-5965 (Universal Testing Machine, Instron Co., Ltd), 5 specimens in a dumbbell shape were prepared in accordance with ASTM D638 specifications, and then tensile strength was measured for each of the 5 specimens at a rate of 500 mm/min. The average tensile strength thereof is shown as a result.

In addition, elongation was measured under the same conditions as the tensile strength, while the elongation was measured until each of the 5 specimens were cut. The average elongation thereof is shown as a result. Meanwhile, elongation is a measure representing the flexibility of a resin. When elongation is 150% or higher, flexibility is sufficiently excellent.

TABLE 2

| Classification | Tensile strength (kgf/cm²) | Elongation (%) | Thermal stability | | | Heat shrinkage rate (%) |
| --- | --- | --- | --- | --- | --- | --- |
| | | | x (cm) | y (cm) | A (cm²) | |
| Example 1 | 272 | 439 | 4.90 | 14.60 | 71.54 | 4.61 |
| Example 2 | 290 | 543 | 4.90 | 14.62 | 71.64 | 4.48 |
| Example 3 | 140 | 561 | 4.90 | 14.60 | 71.54 | 4.61 |
| Example 4 | 230 | 644 | 4.85 | 14.60 | 70.81 | 5.59 |
| Comparative Example 1 | 166 | 176 | 4.90 | 13.80 | 67.62 | 9.84 |
| Comparative Example 2 | 165 | 181 | 4.90 | 14.10 | 69.09 | 7.88 |
| Comparative Example 3 | — | — | — | — | — | — |

As confirmed through Table 2 above, Example 1 to Example 4 exhibited excellent tensile strength and elongation and exhibited significantly improved thermal stability compared to Comparative Example 1 and Comparative Example 2.

Specifically, when compared to Comparative Example 1 not including a heat shrinkage prevention agent, Example 1 to Example 4 had excellent tensile strength and elongation, and at the same time, the heat shrinkage rate thereof was significantly decreased by about half. Also, when compared to Comparative Example 2 including a heat shrinkage prevention agent but including the same in an amount of less than the content proposed in the present invention, Example 1 to Example 4 had excellent tensile strength and elongation and exhibited a heat shrinkage rate decreased by about 30% to 40%.

Through the above results, it was confirmed that the polyalkylene carbonate-based resin of the present invention had an effect of remarkably improving a heat shrinkage phenomenon by including a polyalkylene carbonate resin and a polylactide resin as base resins and including a heat shrinkage prevention agent in a specific content, thereby having excellent tensile strength and elongation and having excellent thermal stability.

The invention claimed is:

1. A polyalkylene carbonate-based resin comprising:
   100 parts by weight of a base resin including a polyalkylene carbonate resin and a polylactide resin; and
   5 parts by weight to 10 parts by weight of a heat shrinkage prevention agent,
   wherein the base resin includes the polyalkylene carbonate resin and the polylactide resin in a weight ratio of 6:4 to 4:6; and
   wherein the heat shrinkage prevention agent is one or more resins selected from the group consisting of a polyalkyl(meth)acrylate-based resin, a polyalphaolefin-vinyl acetate-based resin, and a polyoxyalkylene-based resin.

2. The polyalkylene carbonate-based resin of claim 1, wherein the polyalkyl(meth)acrylate-based resin is a polymethyl methacrylate resin.

3. The polyalkylene carbonate-based resin of claim 1, wherein the polyalphaolefin-vinyl acetate-based resin is a polyethylene-vinyl acetate-based resin.

4. The polyalkylene carbonate-based resin of claim 1, wherein the polyoxyalkylene-based resin is a polyoxymethylene resin.

5. The polyalkylene carbonate-based resin of claim 1, wherein the heat shrinkage prevention agent is a polyalkyl (meth)acrylate-based resin.

6. The polyalkylene carbonate-based resin of claim 1, wherein the polyalkylene carbonate resin is one or more resins selected from the group consisting of polyethylene carbonate, polypropylene carbonate, polypentene carbonate, polyhexene carbonate, polyoctene carbonate, and polycyclohexene carbonate.

7. The polyalkylene carbonate-based resin of claim 1, wherein the weight average molecular weight of the polyalkylene carbonate resin is 10,000 g/mol to 1,000,000 g/mol.

8. A polyalkylene carbonate-based molded article produced from the resin as set forth in claim 1.

9. The polyalkylene carbonate-based molded article of claim 8, wherein the molded article is a blown film.

10. The polyalkylene carbonate-based molded article of claim 8, wherein the molded article is left to stand for 3 hours in an oven of 65° C. to measure the length thereof in a machine direction (MD) and a width direction (TD) and the area (A) thereof, and the heat shrinkage rate (%) thereof calculated using Equation 1 below is 7.00% or lower:

$$\text{Heat shrinkage rate (\%)} = [(\text{Initial area (B)} - \text{Area (A)})/\text{Initial area (B)}] \times 100 \quad [\text{Equation 1}]$$

wherein in Equation 1, the initial area (B) is the molded article before heat is applies thereto.

* * * * *